US009522652B2

(12) United States Patent
Choi

(10) Patent No.: US 9,522,652 B2
(45) Date of Patent: Dec. 20, 2016

(54) SYSTEM AND METHOD FOR MONITORING SECURITY AROUND A VEHICLE

(71) Applicant: Hyundai Motor Company, Seoul (KR)

(72) Inventor: Byung Sik Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 14/527,108

(22) Filed: Oct. 29, 2014

(65) Prior Publication Data

US 2015/0266452 A1 Sep. 24, 2015

(30) Foreign Application Priority Data

Mar. 21, 2014 (KR) ........................ 10-2014-0033536

(51) Int. Cl.
| | | |
|---|---|---|
| *B60R 25/10* | (2013.01) | |
| *B60R 25/31* | (2013.01) | |
| *G01S 19/13* | (2010.01) | |
| *G01S 19/16* | (2010.01) | |
| *B60R 25/102* | (2013.01) | |

(52) U.S. Cl.
CPC ............ *B60R 25/31* (2013.01); *B60R 25/102* (2013.01); *G01S 19/13* (2013.01); *G01S 19/16* (2013.01)

(58) Field of Classification Search
CPC ................ B60R 25/31; B60R 2325/20; B60R 2325/202; B60R 2325/205; B60R 25/102; G01S 19/13; G01S 19/16
USPC .............. 340/426.1, 426.13, 426.16–426.21, 340/426.24, 426.34, 539.11, 539.13, 565; 455/456.1, 457
See application file for complete search history.

(56) References Cited

U.S. PATENT DOCUMENTS

| | | | | |
|---|---|---|---|---|
| 2005/0245233 | A1* | 11/2005 | Anderson | H04L 63/08 455/411 |
| 2012/0142367 | A1* | 6/2012 | Przybylski | H04W 4/046 455/456.1 |
| 2014/0333425 | A1* | 11/2014 | Giraud | H04W 84/005 340/438 |

FOREIGN PATENT DOCUMENTS

| | | |
|---|---|---|
| JP | H05-112207 A | 5/1993 |
| JP | 2005-092622 A | 4/2005 |
| JP | 2005-335635 A | 12/2005 |
| JP | 2007317074 A | 12/2007 |
| KR | 10-2012-0040520 A | 4/2012 |
| KR | 20120035353 A | 4/2012 |
| KR | 101145510 B1 | 5/2012 |
| KR | 101309121 B1 | 9/2013 |

* cited by examiner

*Primary Examiner* — Thomas Mullen
(74) *Attorney, Agent, or Firm* — Mintz Levin Cohn Ferris Glovsky and Popeo, P.C.; Peter F. Corless

(57) ABSTRACT

A system and method for monitoring security around a vehicle are provided. The method includes searching, by a controller, for a mobile device in the vicinity of the vehicle and determining whether a detected mobile device is an identified mobile device previously known to the vehicle. When the detected mobile device is the identified mobile device, the controller is configured to continuously search for another mobile device. When the detected mobile device is an unknown mobile device, the controller is configured to transmit information regarding the detected mobile device to a driver of the vehicle when the time or the frequency of which the detected mobile device is searched in the vicinity of the vehicle is greater than a pre-set time or frequency.

20 Claims, 4 Drawing Sheets

SYSTEM AND METHOD FOR MONITORING SECURITY AROUND A VEHICLE

CROSS-REFERENCE TO RELATED APPLICATION

This application is based on and claims priority from Korean Patent Application No. 10-2014-0033536, filed on Mar. 21, 2014 in the Korean Intellectual Property Office, the disclosure of which is incorporated herein in its entirety by reference.

BACKGROUND

Field of the Invention

The present invention relates to a system and method for monitoring security around a vehicle, and more particularly, to a method for monitoring security around a vehicle by searching a mobile device around a vehicle and detecting a potential danger factor around a vehicle.

Description of the Prior Art

When a driver of the parked vehicle returns to the vehicle alone, auto-theft or other crimes may occur. In such a case, while the intruder waits until the driver of the vehicle approaches and releases the door lock of the vehicle, at the moment to release the door lock of the vehicle, the intruder may enter into the vehicle and attack the driver. Therefore, a safety means against an intruder waiting around a vehicle should be considered.

As a safety means for determining whether an intruder is present around a vehicle, a video security system has been developed for obtaining the image around a vehicle. The video security system is increasingly used for preventing crimes and accidents generated regardless of time and place and quickly handling an accident such as arresting a criminal. However, currently, the video security system is merely capable of acquiring an image storing the image. The video security system is not capable of informing a driver of a vehicle of an intruder present around the vehicle in real time. In addition, such a video security system is essentially required to install a separate device such as a video camera and a storage device.

SUMMARY

The object of the present invention is to provide a method for monitoring security around a vehicle by detecting the mobile devices of anonymous users present around a vehicle, and when the detection of the mobile device is greater than a particular time or a particular frequency, regarding the detection as a potential dangerous factor and informing the driver of the vehicle of the danger in real-time.

The method for monitoring security around a vehicle according to an exemplary embodiment of the present invention may include: searching a mobile device in the vicinity of the vehicle; determining whether the searched mobile device is an identified mobile device which is previously known to the vehicle; returning to the step of searching, when the searched mobile device is the identified mobile device; and transmitting information for the searched mobile device to a driver of the vehicle when the time or the frequency which the searched mobile device is searched in the vicinity of the vehicle is greater than a pre-set time or frequency, when the searched mobile device is not the identified mobile device (e.g., an unknown mobile device).

In an exemplary embodiment, the information for the searched mobile device may include at least one of a type of the searched mobile device, a searched time, a searched total time, a searched frequency, or a distance from the vehicle. In addition, the transmission process may include transmitting information for the searched mobile device from the vehicle to a server disposed separate from the vehicle; and transmitting information for the searched mobile device transmitted to the server from the server to the mobile device of the driver.

The method may further include identifying a position of the vehicle; determining risk information of the position of the vehicle by comparing the position of the vehicle and information for a dangerous area; determining information for the searched mobile device to be transmitted to the driver according to the risk information; and determining a time interval or a frequency which the information for the searched mobile device is transmitted to the driver according to the risk information.

Additionally, the method may further include identifying a position of the vehicle; determining risk information of the position of the vehicle with reference to time-based risk information of the position of the vehicle; determining information for the mobile device to be transmitted to the driver according to the risk information; and determining a time interval or a frequency which the information for the searched mobile device is transmitted to the driver according to the risk information. The information regarding a state of the vehicle may then be transmitted to the driver according to the risk information.

In an additional exemplary embodiment, the information regarding the state of the vehicle may include at least one of whether the position of the vehicle is moving, whether the battery cable of the vehicle is disconnected, whether the door of the vehicle is open, or whether the window of the vehicle is broken. In addition, the information regarding the dangerous area may be previously stored in a telematics server, and may be provided to the vehicle according to a request of the vehicle. The time-based risk information of the position of the vehicle may be previously stored in a telematics server, and may be provided to the vehicle according to a request of the vehicle. The distance from the vehicle may be obtained through RSSI (Received Signal Strength Indication) of a signal transmitted from the searched mobile device to the vehicle. Further, the determination process of whether the searched mobile device is the identified mobile device may be based on a MAC address obtained when previously paired with the vehicle. When a MAC address in the vehicle is not obtained, a guidance message for setting the identified mobile device may be provided to the driver.

The method for monitoring security around a vehicle according to the present invention may detect the mobile devices of anonymous users present around a vehicle (e.g., within a predetermined vicinity or proximity to the vehicle), and when the detection of the mobile device is greater than a particular time or a particular frequency, as the detection may be determined to be a potential dangerous factor and the driver of the vehicle may be informed of the danger in real-time.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
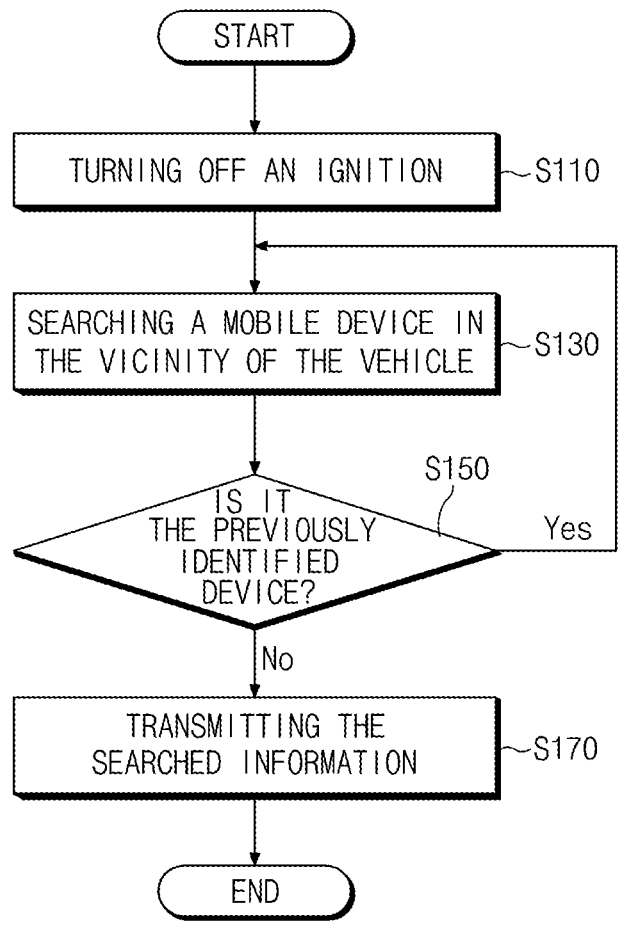
FIG. 1 is an exemplary diagram showing a method for monitoring security around a vehicle according to an exemplary embodiment of the present invention.

The advantage and features of the present invention and how to achieve it will be explained through exemplary embodiments described in detail with the accompanying drawings. However, the invention is not limited to exemplary embodiments described herein and may be embodied in other aspects. The present exemplary embodiments are provided for explaining to those skilled in the art to which this invention pertains in detail to the extent that it is possible to easily embody the technical spirit of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory 11 and a processor 12. The memory 11 is configured to store the modules and the processor 12 is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the drawings, exemplary embodiments of the present invention are not limited to the shown specific aspects and are exaggerated for clarification. Although specific terms are used herein, it is only used for explaining the present invention, and it is not used for limiting the meaning or the scope of the present invention described in the claims. The expression "and/of" herein is used as the meaning including at least one of components listed before and after the expression. Also, the expression "connected/coupled" is used as the meaning including being directly connected with another component or indirectly connected through another component.

Hereinafter, with reference to the drawings an exemplary embodiment of the present invention will be described in detail.

FIG. 1 is an exemplary diagram showing a method for monitoring security around a vehicle according to an exemplary embodiment of the present invention. Referring FIG. 1, the method for monitoring security around a vehicle 10 may include the steps of S110 to S170. First, the vehicle 10 may be parked when the ignition is turned off (S110).

Once a driver 80 has left the vehicle, a controller 20 (e.g., vehicle controller) installed within the vehicle 10 may be configured to search for mobile devices in the vicinity of the vehicle 10 (e.g., within a predetermined proximity) using a multimedia system (for example, AVN) disposed within the vehicle 10 (S130). In particular, the vehicle controller 20 may be configured to determine a mobile device may connect to the system via a BLUETOOTH system or a local area WiFi (wireless) system disposed within the vehicle. Specifically, the signal that searches for the mobile device which may connect to the system may be radiated near the vehicle 10 in a particular time interval. When a BLUETOOTH system or a local area WiFi is activated, the mobile devices around the vehicle 10 that receive the signal may transmit a response signal to the BLUETOOTH system or the local area WiFi system, and the vehicle controller 20 may be configured to receive the signal from a mobile device to determine whether the mobile device is present around the vehicle.

Further, the controller 20 may be configured to determine whether the searched mobile device 30 is a previously identified mobile device 40 already known to the vehicle 10 (S150). The determination of whether the searched mobile device 30 is the identified mobile device 40 already known to the vehicle, may include determining whether the searched mobile device 30 is the identified mobile device 40 by comparing the MAC address of the searched mobile device 30 with the MAC address obtained from the mobile devices previously paired or connected to the vehicle, through the transmitted response signal from the mobile device.

Additionally, when no history exists in the system for use of a BLUETOOTH system, etc., the multimedia system of the vehicle 10 may be configured to provide the message guiding the driver 80 of the vehicle 10 to the setting for determining the identified mobile device 40. In particular, the message may be provided to the passenger of the vehicle 10 through the multimedia system operated by the vehicle controller 20 and disposed within the vehicle, or directly provided to the mobile terminal of the user (e.g., the driver 80) of the vehicle 10 registered in the telematics system of the vehicle. The user of the vehicle, to which this message may be provided, may register a mobile terminal as the identified mobile device 40 which becomes the object compared with the searched mobile device 30 and determined in future.

As a result of the determination in S150, when the mobile device detected within a predetermined proximity to the vehicle 10 in step S130 is the previously known identified mobile device 40, the process may return to step S130. In addition, the vehicle controller 20 may be configured to continuously search for mobile devices in the vicinity of the vehicle. When, as a result of the determination in S150, the detected mobile device is not the previously known identified mobile device 40 (e.g., the detected mobile device is determined to be an unknown mobile device), the controller 20 may be configured to determine that the total time or the frequency which the mobile device is searched in the vicinity of the vehicle 10 is greater than a particular level. The total time or the frequency of a particular level may be preset by the user of the vehicle.

When the searched total time or the searched frequency is greater than the pre-set time or frequency, information for the detected mobile device in the vicinity of the vehicle 10 may be transmitted to the driver 80 of the vehicle 10 (S170). In particular, information regarding the detected mobile device (e.g., the mobile device detected in the search process) may include at least one of whether the mobile device searched at step S130 is any type of mobile device, the time which the mobile device is searched in the vicinity of the vehicle, the total time which the mobile device is searched in the vicinity of the vehicle, the frequency with which the mobile device is searched in the vicinity of the vehicle, and information regarding the distance between the vehicle 10 and the detected mobile device. Further, information regarding the distance between the vehicle 10 and the detected mobile device, may be obtained through RSSI (Received Signal Strength Indication) of the response signal transmitted from the detected mobile device at step S130 to the vehicle.

Although the driver 80 of the vehicle 10 receiving information for the detected mobile device may be located apart from the vehicle, the driver 80 may recognize whether the anonymous presence (e.g., potentially dangerous intruder) is located in the vicinity of the vehicle. In other words, without a need for a separate sensor, the situation around the vehicle 10 may be monitored in real time, a schematic security status information in the vicinity of the vehicle 10 may be transmitted in real time to the driver 80 of the vehicle.

Figure 2:
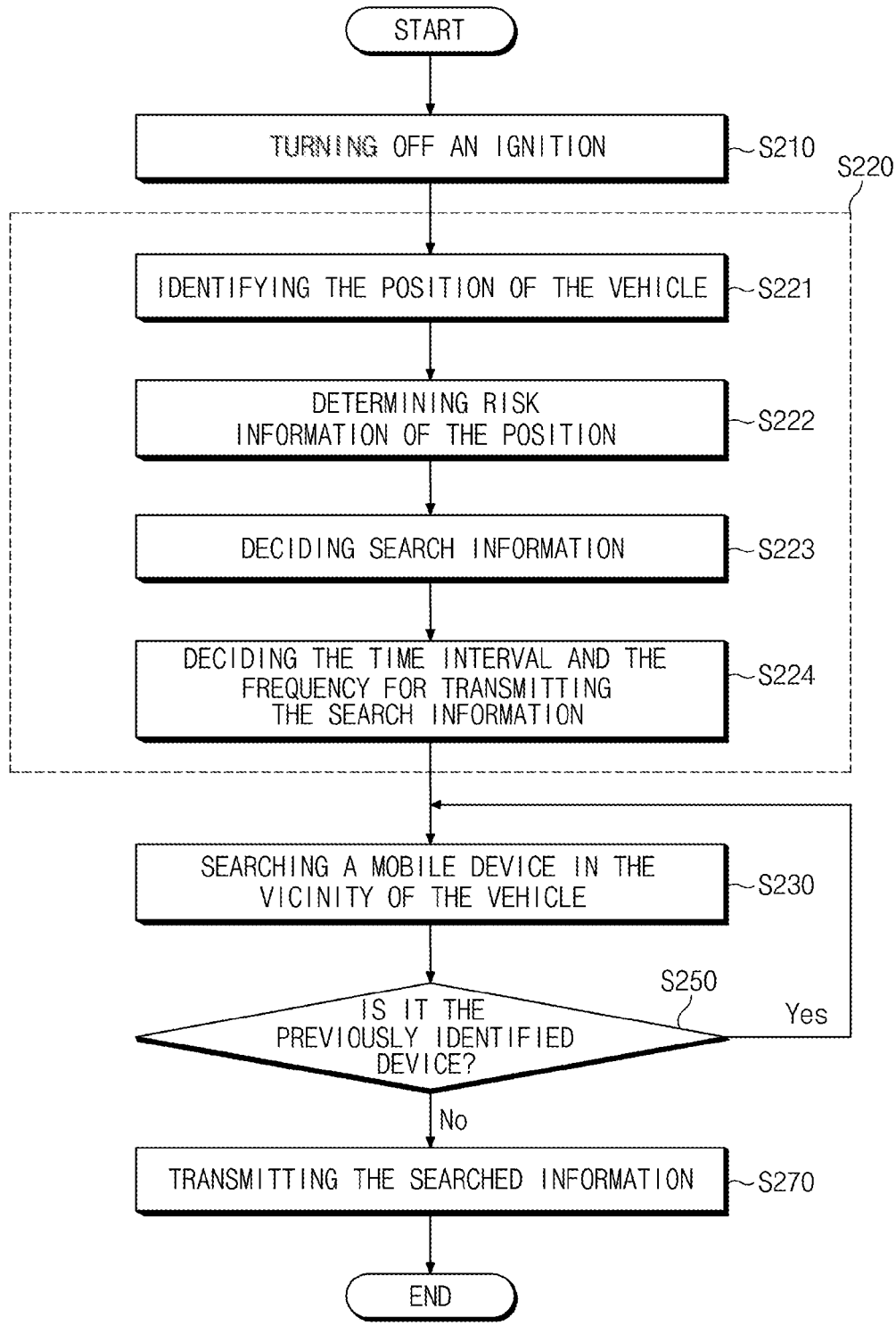
FIG. 2 is an exemplary diagram showing a method for monitoring security around a vehicle according to another exemplary embodiment of the present invention.

FIG. 2 is an exemplary diagram showing a method for monitoring security around a vehicle according to another exemplary embodiment of the present invention. Referring to FIG. 2, the method for monitoring security around a vehicle 10 may further include step S220, together with step S210 to step S270. Since step S210 to step S270 of FIG. 2 are the same as steps S110 to S170 described in FIG. 1, the detailed description thereof is omitted, step S220 is specifically described. The method for monitoring security around a vehicle 10 of FIG. 2 may control the method for monitoring security around a vehicle 10 according to the parked position of the vehicle, unlike the method for monitoring security around a vehicle 10 of FIG. 1.

The vehicle 10 may be stopped by turning off the ignition (S210), and then the parked or stopped position of the vehicle 10 may be identified by the controller 20 (S221). In particular, the position of the vehicle 10 may be identified by using global positioning system (GPS) information obtained via GPS disposed within the vehicle. Further, with respect to the position of the vehicle 10 identified in step S221, risk information of the current position may be determined (S222). The risk information of the position may be determined by the controller 20 by comparing information for the dangerous area which may include a crime rate according to the position and the area in which the vehicle 10 is currently parked or stopped. In particular, information regarding the crime rate of various areas may be known to the general public. This information regarding the dangerous area may be previously stored in the multimedia system of the vehicle, and, in addition, previously stored in the telematics server 70, and may be provided through the telematics system according to the request of the vehicle.

In addition, with respect to the position of the vehicle 10 identified in step S221, in step S222 the vehicle controller 20 may be configured to determine risk information for the position in which the vehicle 10 is located with reference to time-based risk information of the position. In particular, time-based crime rate information of the position in which the vehicle 10 is currently parked or stopped, may be included in the time-based risk information. In other words, although the position in which the vehicle 10 is parked or stopped is the same area, since crime rate may vary depending on the particular time of day (e.g., daytime versus nighttime), by reflecting such variances, the controller 20 may be configured to adaptively change information regarding the detected mobile device to be transmitted to the driver 80 of the vehicle, the transmitted time interval and the frequency. Additionally, the time-based risk information may be previously stored in the multimedia system, also, previously stored in the telematics server 70, and may be provided through the telematics system according to the request of the vehicle.

In accordance with the risk information based on the current position of the vehicle 10 determined in step S222, information regarding the detected mobile device to be transmitted in step S270 may be determined (S223), in addition to this, the time interval and the frequency may be determined (S224). In other words, the time interval and the frequency providing the security information around the vehicle 10 may be determined differently. In the case of a high-risk area (e.g., predetermined high-risk area), the frequency of transmitting information (information regarding the detected mobile device) may be increased or the time interval may be decreased, and in the case of a relatively low-risk area, the frequency of transmitting information may be decreased or the time interval may be increased.

Further, in step S223, information regarding the current state of the parked vehicle 10 may be transmitted to the driver 80 of the vehicle 10 according to the risk information determined in step S222. Specifically, the information regarding the current state of the vehicle 10 may include at least one of whether the position of the vehicle 10 is moving, whether the battery cable 13 of the vehicle 10 is disconnected, whether the door 14 of the vehicle 10 is open, or whether the window 15 of the vehicle 10 is broken. Whether the position of the vehicle 10 is moving may be determined using GPS information. In addition, whether the battery cable 13 of the vehicle 10 is disconnected, whether the door 14 of the vehicle 10 is open, or whether the window 15 of the vehicle 10 is broken, etc. may be determined by a sensor provided within the vehicle. The information for the current state of the vehicle 10 may be transmitted to the driver 80 together with information regarding the detected mobile device to be transmitted to the driver 80 in step S270.

Additionally, according to the risk information determined in step S222, the process of searching for mobile devices in the vicinity of the vehicle 10 may be adaptively changed. In particular, in a relatively high-risk area, the frequency of searching for the mobile devices may be increased or the time interval may be decreased, and conversely, in a relatively low-risk area, the frequency of searching for the mobile devices may be decreased or the time interval may be increased.

As described above, since the frequency and the time interval of searching for the mobile devices in the vicinity of the vehicle, and the time interval and the frequency of transmitting the information of the detected mobile device and the information for the state of the vehicle 10 may be adaptively changed according to the degree of risk for the area in which the vehicle 10 is currently parked, the security around the vehicle 10 may be more efficiently monitored.

Figure 3:
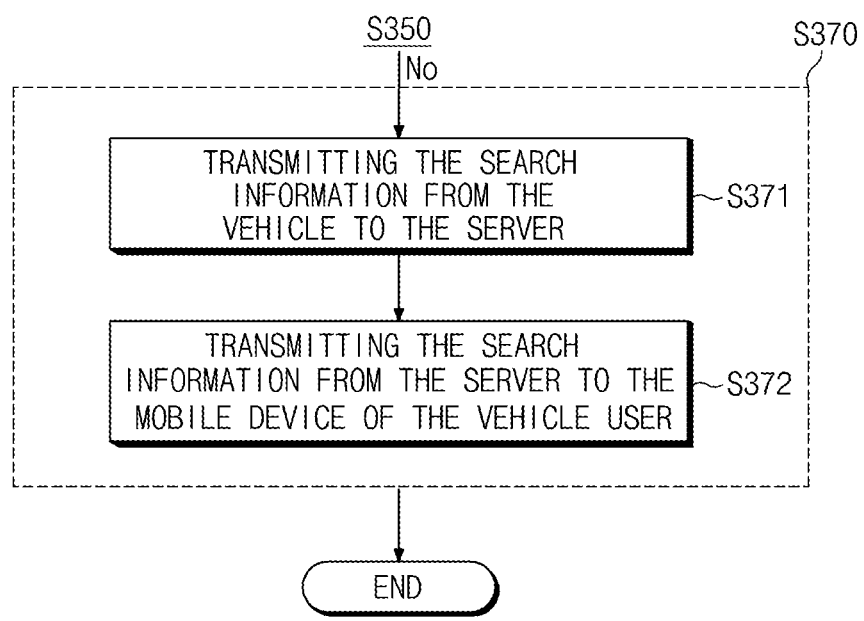
FIG. 3 is an exemplary diagram showing a method for monitoring security around a vehicle according to another exemplary embodiment of the present invention.
Figure 4:
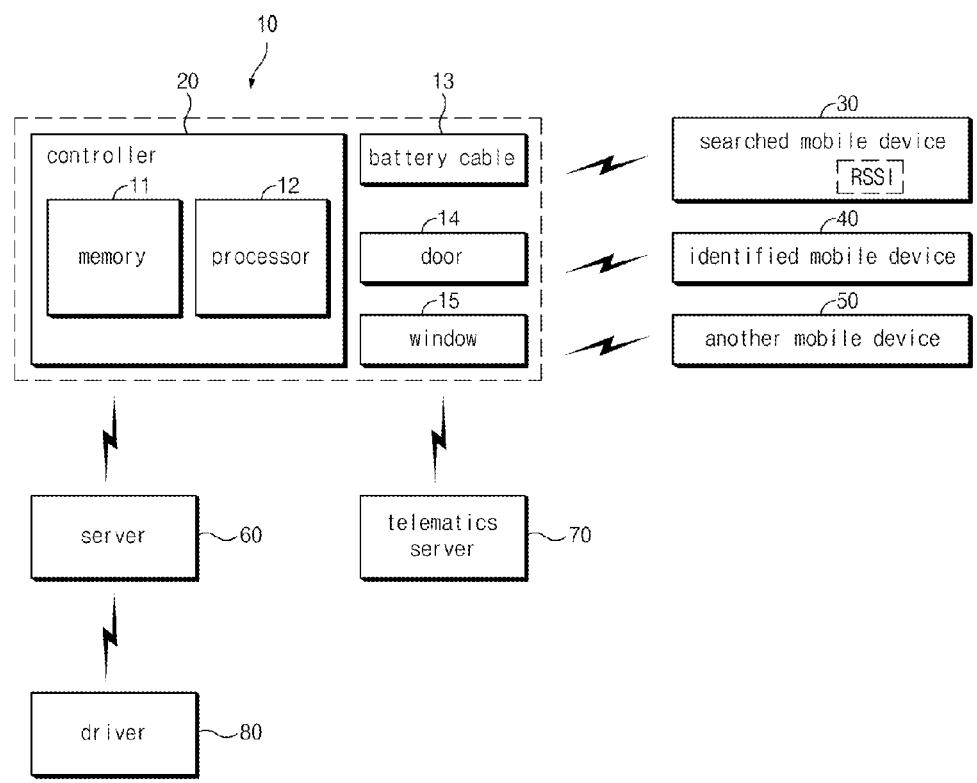
FIG. 4 is an exemplary diagrammatic representation of monitoring security around a vehicle according to exemplary embodiments of the present invention.

FIG. 3 is an exemplary diagram showing a method for monitoring security around a vehicle according to another exemplary embodiment of the present invention. Referring to FIG. 3, the process of transmitting the search information of the method for monitoring security around the vehicle 10 may include step S371 and step S372. First, step S370 of FIG. 3 corresponds to step S170 and step S270 of FIG. 1 and FIG. 2. That is, when the mobile device detected in the vicinity of the vehicle 10 is not the previously known, identified mobile device 40 (e.g., is determined to be an unknown device), step S370 may include transmitting the information regarding the detected mobile device to the driver 80 of the vehicle.

In particular, in step S350 corresponding to step S150 and step S250 of FIG. 1 and FIG. 2, the detected mobile device may be an unknown or unidentified mobile device 50, and when the time or the frequency of searching for the detected mobile device is greater than the pre-set time or the frequency, the search information which is the information regarding the detected mobile device may be transmitted by the controller 20 from the vehicle 10 to the server 60 (S371). In particular, the server 60 may be disposed separately from the vehicle 10 and may be a server configured to implement a telematics service (e.g., telematics server 70). In addition, the search information transmitted to the server 60 may be transmitted from the server 60 to the mobile device of the vehicle user (for example, driver 80) (S372). The search information may be transmitted through the mobile network which the mobile device possessed by the user of the vehicle 10 is subscribed.

Accordingly, since the method for monitoring security around the vehicle according to the present invention may be configured to determine whether a potential intruder is present in the vicinity of the parked vehicle in a particular time or a particular frequency by monitoring the status of the vicinity of the vehicle without a separate sensor information and may be configured to transmit the information to the driver in real time, vehicle intrusion may be prevented.

In the above description, the present invention has been described through specific examples, but it may be well understood that various modifications may be made without departing from the scope of the present invention. Therefore, the scope of the present invention is not limited to the above described exemplary embodiments, and it should be defined by the appended claims and their equivalents. When taking the foregoing description into account, if the modifications and variations of the present invention fall within the following claims and their equivalents, then it is construed that the present invention includes these modifications and variations.

What is claimed is:

1. A method comprising:
    searching, by a controller, for a mobile device in the vicinity of a vehicle;
    determining, by the controller, whether a mobile device that is detected during the searching is an identified mobile device previously known to the vehicle;
    searching, by the controller, for another mobile device in the vicinity of the vehicle in response to determining that the detected mobile device is the identified mobile device previously known to the vehicle; and
    transmitting, by the controller, information regarding the detected mobile device to a driver of the vehicle when the time or the frequency for which the detected mobile device is searched in the vicinity of the vehicle is greater than a pre-set time or frequency, in response to determining that the detected mobile device is an unknown mobile device.

2. The method of claim 1, wherein the information regarding the detected mobile device includes at least one selected from a group consisting of: a type of the detected mobile device, a search time, a search frequency, and a distance from the vehicle.

3. The method of claim 2, wherein the distance from the vehicle is obtained through an RSSI (Received Signal Strength Indicator) of a signal transmitted from the detected mobile device to the vehicle.

4. The method of claim 1, wherein the transmitting of the information regarding the detected mobile device includes:
    transmitting, by the controller, information for the detected mobile device from the vehicle to a server; and
    transmitting, by the controller, information regarding the detected mobile device transmitted to the server from the server to the mobile device of a driver of the vehicle.

5. The method of claim 1, further comprising:
    identifying, by the controller, a position of the vehicle;
    determining, by the controller, risk information of the position of the vehicle by comparing the position of the vehicle and information for a dangerous area;
    determining, by the controller, information for the detected mobile device to be transmitted to the driver according to the risk information; and
    determining, by the controller, a time interval or a frequency with which the information regarding the detected mobile device is transmitted to the driver according to the risk information.

6. The method of claim 5, further comprising:
    transmitting, by the controller, information regarding a state of the vehicle to the driver according to the risk information.

7. The method of claim 6, wherein the information regarding the state of the vehicle includes at least one selected from a group consisting of: whether the position of the vehicle is changed, whether a battery cable of the vehicle is disconnected, whether a door of the vehicle is open, and whether a window of the vehicle is broken.

8. The method of claim 5, wherein the information regarding the dangerous area is stored in a telematics server, and is provided to the vehicle according to a request of the vehicle.

9. The method of claim 1, further comprising:
    identifying, by the controller, a position of the vehicle;
    determining, by the controller, risk information of the position of the vehicle with reference to time-based risk information of the position of the vehicle;

determining, by the controller, information regarding the detected mobile device to be transmitted to the driver according to the risk information; and determining, by the controller, a time interval or a frequency with which the information regarding the detected mobile device is transmitted to the driver according to the risk information.

10. The method of claim 9, wherein the time-based risk information regarding the position of the vehicle is stored in a telematics server, and is provided to the vehicle according to a request of the vehicle.

11. The method of claim 1, wherein the determination of whether the detected mobile device is the identified mobile device previously known to the vehicle is based on a MAC address that was obtained when the identified mobile device was previously paired with the vehicle.

12. The method of claim 11, wherein a guidance message for setting the identified mobile device is provided to a driver of the vehicle when a MAC address is not detected.

13. A system comprising:
a memory configured to store program instructions; and
a processor configured to execute the program instructions, which when executed cause to processor to:
 search for a mobile device in the vicinity of a vehicle;
 determine whether a mobile device that is detected during the search is an identified mobile device previously known to the vehicle;
 search for another mobile device in the vicinity of the vehicle in response to determining that the detected mobile device is the identified mobile device previously known to the vehicle; and
 transmit information regarding the detected mobile device to a driver of the vehicle when the time or the frequency for which the detected mobile device is searched in the vicinity of the vehicle is greater than a pre-set time or frequency, in response to determining that the detected mobile device is an unknown mobile device.

14. The system of claim 13, wherein the information regarding the detected mobile device includes at least one selected from a group consisting of: a type of the detected mobile device, a search time, a search frequency, and a distance from the vehicle.

15. The system of claim 13, wherein the processor is further caused to:
 transmit information for the detected mobile device from the vehicle to a server; and
 transmit information regarding the detected mobile device transmitted to the server from the server to the mobile device of the driver.

16. The system of claim 13, wherein the processor is further caused to:
 identify a position of the vehicle;
 determine risk information of the position of the vehicle by comparing the position of the vehicle and information for a dangerous area;
 determine information for the detected mobile device to be transmitted to the driver according to the risk information; and
 determine a time interval or a frequency with which the information regarding the detected mobile device is transmitted to the driver according to the risk information.

17. A non-transitory computer readable medium storing program instructions, which when executed by a controller cause the controller to perform steps comprising:
 searching for a mobile device in the vicinity of a vehicle;
 determining whether a mobile device that is detected during the searching is an identified mobile device previously known to the vehicle;
 searching for another mobile device in the vicinity of the vehicle in response to determining that the detected mobile device is the identified mobile device previously known to the vehicle; and
 transmitting information regarding the detected mobile device to a driver of the vehicle when the time or the frequency for which the detected mobile device is searched in the vicinity of the vehicle is greater than a pre-set time or frequency, in response to determining that the detected mobile device is an unknown mobile device.

18. The non-transitory computer readable medium of claim 17, wherein the information regarding the detected mobile device includes at least one selected from a group consisting of: a type of the detected mobile device, a search time, a search frequency, and a distance from the vehicle.

19. The non-transitory computer readable medium of claim 17, wherein the controller is caused to perform steps further comprising:
 transmitting information for the detected mobile device from the vehicle to a server; and
 transmitting information regarding the detected mobile device transmitted to the server from the server to the mobile device of the driver.

20. The non-transitory computer readable medium of claim 17, wherein the controller is caused to perform steps further comprising:
 identifying a position of the vehicle;
 determining risk information of the position of the vehicle by comparing the position of the vehicle and information for a dangerous area;
 determining information for the detected mobile device to be transmitted to the driver according to the risk information; and
 determining a time interval or a frequency with which the information regarding the detected mobile device is transmitted to the driver according to the risk information.

* * * * *